United States Patent [19]

Lefebvre

[11] Patent Number: 4,624,784

[45] Date of Patent: Nov. 25, 1986

[54] APPARATUS INCLUDING A FLOW PATH FORMED BY MEMBRANE COMPRESSION

[75] Inventor: Michel S. Lefebvre, New South Wales, Australia

[73] Assignee: Memtec Limited, Australia

[21] Appl. No.: 679,613

[22] PCT Filed: Sep. 3, 1981

[86] PCT No.: PCT/AU81/00126

§ 371 Date: Apr. 28, 1982

§ 102(e) Date: Apr. 28, 1982

[87] PCT Pub. No.: WO82/00775

PCT Pub. Date: Mar. 18, 1982

Related U.S. Application Data

[63] Continuation of Ser. No. 375,139, Apr. 28, 1982, abandoned.

[30] Foreign Application Priority Data

Sep. 3, 1980 [AU] Australia .............................. PE5372

[51] Int. Cl.[4] .............................................. B01D 13/00
[52] U.S. Cl. .................................. 210/321.1; 210/356; 210/433.2; 210/450
[58] Field of Search ............... 210/321.1, 321.2, 321.3, 210/321.4, 321.5, 356, 433.2, 450, 456, 500.2; 422/48; 55/158

[56] References Cited

U.S. PATENT DOCUMENTS

| 3,501,010 | 3/1970 | Critchell et al. ..................... 210/321 |
| 3,556,302 | 1/1971 | Agranat ............................... 210/321 |
| 3,612,281 | 10/1971 | Leonard ............................. 210/321 |
| 3,730,350 | 5/1973 | Hoeltzenbein ...................... 210/321 |
| 3,788,482 | 1/1974 | Markley .............................. 210/321 |
| 3,864,248 | 2/1975 | Granger et al. ..................... 210/321 |
| 3,907,687 | 9/1975 | Hoeltzenbein ...................... 210/321 |
| 3,910,841 | 10/1975 | Esmond .............................. 210/321 |
| 3,943,057 | 3/1976 | Jamet et al. ........................ 210/321 |
| 4,024,059 | 5/1977 | Sausse ................................ 210/321 |
| 4,160,791 | 7/1979 | Higley et al. ................ 210/500.2 X |
| 4,234,428 | 11/1980 | Schnell .............................. 210/321 |

FOREIGN PATENT DOCUMENTS

| 113788 | 9/1941 | Australia . |
| 146639 | 2/1951 | Australia . |
| 448502 | 8/1971 | Australia . |
| 505494 | 11/1979 | Australia . |
| 918810 | 10/1954 | Fed. Rep. of Germany . |
| 2430488 | 1/1975 | Fed. Rep. of Germany ...... 210/321 |
| 1355671 | 6/1974 | United Kingdom . |
| 1417564 | 12/1975 | United Kingdom . |

OTHER PUBLICATIONS

Lacey, R. E. et al, *Industrial Processing with Membranes,* Wiley-Interscience, N.Y., 1972, p. 211.

Nose, Y., "Critical Review of Renal Prostheses", CRC, Critical Reviews in Bioengineering, Oct. 1972, pp. 255-271.

*Primary Examiner*—David Sadowski
*Attorney, Agent, or Firm*—George H. Gerstman

[57] ABSTRACT

Apparatus for altering the concentration of a preselected component (11) of a feestock (12) wherein the feedstock (12) flows through flowpaths bounded by overlying barriers (13) which selectively pass the component (11). Flow of feedstock (12) elastically separates the barriers (13) to maintain laminar flow therebetween. The preselected component (11) may be routed to flow selectively through the barriers (13) either into or out of the feedstock (12).

8 Claims, 16 Drawing Figures

APPARATUS INCLUDING A FLOW PATH FORMED BY MEMBRANE COMPRESSION

This application is a continuation of U.S. application Ser. No. 375,139, filed Apr. 28, 1982, now abandoned.

BACKGROUND OF THE INVENTION

The present invention relates to apparatus for altering the concentration of a pre-selected component of a feedstock. The invention is applicable to the removal of micron and submicron species from a fluid phase but it is to be understood that it is not limited thereto For the sake of convenience, the invention will be described in relation to cross-flow retention or filtration in which the pre-selected component or specie is removed from the feedstock by transfer through a barrier adapted to pass the component or specie and to retain the remainder of the feedstock. However, it is to be understood that the invention is not limited thereto as it may equally be applied to the reverse situation in which the preselected specie is introduced through the barrier to the feedstock.

Micron and submicron species (for example, molecules, colloids, particles and droplets) in a fluid phase (for example, an aqueous phase) can be removed in a number of different ways depending on the quantity of species present.

For low concentrations, depth filtration is probably the most common method applied. An alternative approach is to use a surface filter, for example the Nucleopore membrane; this membrane effects removal of particulates by a surface sieving mechanism. Other types of surface membranes are available; these rely on an active surface skin which is backed up by a porous support layer. In particulate filtration operations such membranes behave similarly to Nucleopore membranes.

When the concentration of retained species is high, depth and dead-end surface barriers become much less attractive, as the pressure drop necessary to effect filtration increases rapidly with solids accumulation.

It is to overcome this problem that a new area of micron and submicron species retention is being developed. The technique used is cross-flow retention. In cross-flow retention a surface membrane is used and the build-up of a layer of retained species is minimised by applying a fluid shear field to the upstream fluid adjacent to the barrier surface. This can be done either by stirring or by pumping the fluid across the barrier surface.

According to this technique, it is quite feasible to operate at a steady state in which a solution is effectively split into a permeate and a retentate, and at steady state no more species accumulates at the barrier surface, causing it to lose performance. Alternatively, the system can be operated in a batch mode, and in this case the feed solution gradually increases in concentration, and although this leads to a drop in throughput, the drop is far less than would occur in the dead-end mode where all of the species collect on or in the barrier.

Generally, for each membrane application in the fields of ultrafiltration, dialysis and electrodialysis, the permeability of the membrane system is generally limited by the layer of retained species (i.e. the concentration layer or, eventually the gel layer) which is present. According to the present invention, it is preferred that laminar flow be employed to remove the gel or cake from the surface of the membrane.

In the case of laminar flow there is a relationship for a given concentration of a fluid to be treated and for a given membrane. This relationship links flux, shear rate and length of the filter flowpath.

As given by Blatt et al in 1970, in Membrane Science and Technology, the relationship is in respect of laminar flow conditions and for the gel polarized condition (i.e. when increased pressure does not increase flux). The relationship is given as:

$$J \alpha (\gamma/L)^{0.33} \alpha (U_B)^{0.33} (h_c)^{-0.33} (L)^{-0.33}$$

wherein
J is the flux for a given area of membrane
$U_B$ is the velocity of the fluid
$h_c$ is the height or thickness of the filter flowpath
L is the length of the filter flow path
$\gamma$ is the shear rate
The shear rate is an expression of the ratio of $\nu$ the tangential velocity of fluid between adjacent membranes and the height of the filter flowpath or channel, that is:

$$\gamma \alpha (\nu/hc)$$

When the gel layer (rather than the porosity of the membrane) is the limiting factor to membrane performance, the flux is linked to the shear rate through this ratio. This means that the effect of reducing the channel height or thickness is to increase significantly both the shear rate and the flux.

Generally, in cross-flow retention, the energy involved for recirculation of the feed is the highest direct cost factor of the operation. For classical systems, with $h_c$ of the order of 1 mm, energy consumption is of the order of 1 kW/square meter of membrane installed. In the case of tubular systems, with tubes of diameter of the order of 1 cm., the cost of energy required is even greater.

Accordingly, there is an interest in developing cross-flow capillary retention or filtration and ultrafiltration apparatus wherein the height of the flowpath is significantly reduced, for example to about 50-100 microns. By using a flowpath height of only this magnitude, the pumping capacity required per square meter of membrane is proportionally reduced; double the channel height and the pumping capacity required is more than doubled.

SUMMARY OF THE INVENTION

In accordance with one aspect of the present invention there is provided apparatus for altering the concentration of a pre-selected component(s) of a feedstock including:
 (a) inlet means adapted to admit pressurized feedstock into the apparatus,
 (b) outlet means adapted to remove treated feedstock from the apparatus,
 (c) one or more feedstock flowpaths between the inlet means and outlet means,
 (d) one or more barriers adapted to pass said pre-selected component(s) and having a first surface past which the feedstock is directed, and,
 (e) transfer means adapted to communicate with the opposite surface of the or each barrier,
and wherein the boundaries of the or each flowpath are at least partially defined by said one or more barriers and is adapted to be at least partially elastically enlarged by the passage of feedstock therethrough, and said apparatus further includes limiting means adapted to restrict the extent of elastic enlargement of said one or more flowpaths so as to maintain a laminar flow of said feedstock therein when feedstock is flowing through said one or more flow paths at a predetermined operating pressure. Preferably, the flowpath thickness is such that the apparatus operates under pre-gel polarised conditions so that increased pressure does not increase flux. Although it is possible for the apparatus of the present invention to utilise some components developed for prior art dialysis technology as referenced herein, it will be appreciated that the cross-flow filtration and ultrafiltration technology described herein differs quite significantly to the prior art dialysis technology and that the prior art dialysis apparatus is not suitable as such for the high-pressure cross-flow filtration/ultrafiltration application described herein. For example, the following differences may be noted:

(i) Dialysis is a four vector system for two fluids with apparatus comprising two inlets and two outlets—an inlet and an outlet for the material to be dialysed and a separate inlet and outlet for the dialysing liquid which flows as a counter current to the material to be dialysed. Cross flow filtration, on the other hand, is a three vector system for one fluid—therebeing with only one inlet for the feedstock to be treated and two separate outlets one for the concentrate or retentate and one for the filtrate or permeate (ii) Dialysis results in a dilution of the material being dialysed whereas cross-flow filtration results in concentration of the retained species in the material being treated.

(iii) Dialysis operates at pressures of less than 10 KPa whereas cross-flow filtration is performed at pressures of the order of 100 KPa.

(iv) Dialysis uses low water flux membranes at low flow rates (e.g. 2 liters/day) with a minimum transmembrane pressure gradient. Cross-flow filtration uses high water flux, highly permeable membranes (flow rates e.g. 50 liters/hour) with a large transmembrane pressure gradient.

(v) Dialysis uses a pair of membranes each of about 40 microns thickness with a channel height or thickness of about 150 microns at normal atmospheric pressure. Comparable cross-flow filtration apparatus uses a pair of membranes each of about 120–200 microns thickness with a zero channel height (i.e. the membranes are in contact) at normal atmospheric pressure, and a channel height or thickness of about 50 microns under an operative transmembrane pressure gradient of 100 KPa.

As used in this specification, the term "barrier" includes high flux semi-permeable membranes, biofilters and filters which are both compressible and resilient and/or can be mounted on a compressible and resilient backing or support.

BRIEF DESCRIPTION OF THE DRAWINGS

In order that the invention may be more readily understood and put into practical effect, reference will now be made to the accompanying drawings in which.

DETAILED DESCRIPTION OF THE PREFERRED EMBODIMENTS

Figure 1:
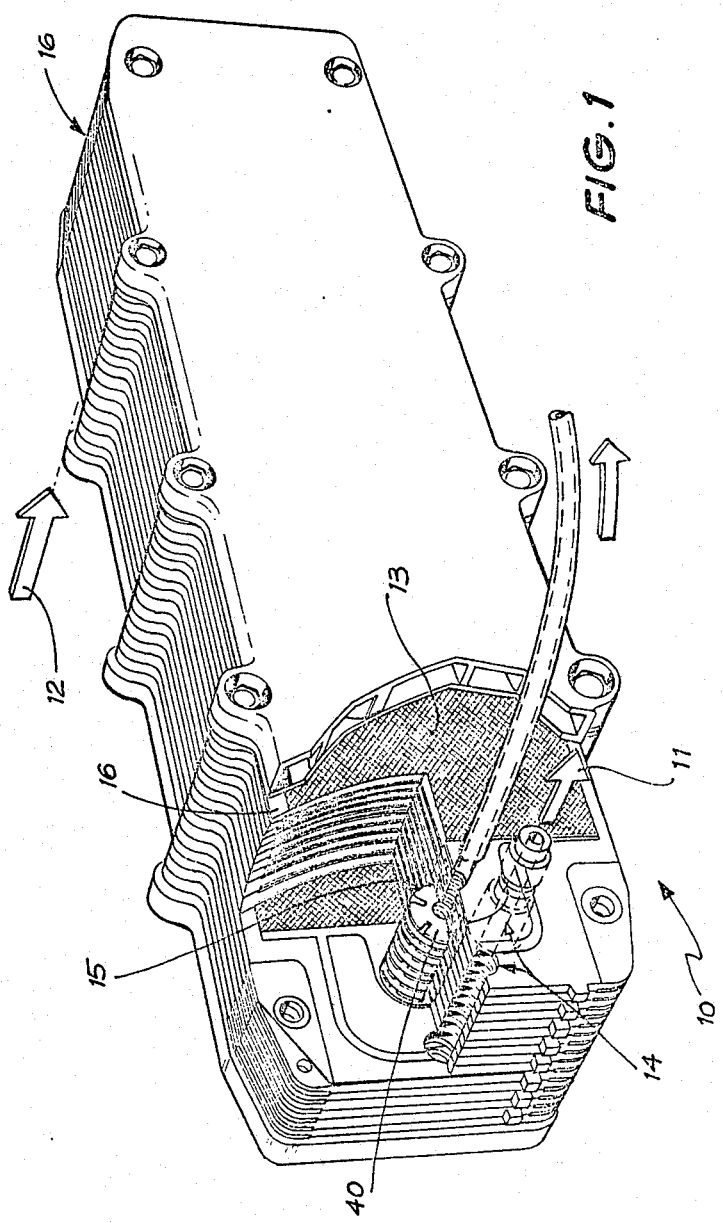
FIG. 1 is a perspective view (partly broken away) of a fluid treatment apparatus or filter according to a first embodiment of the invention.
Figure 2:
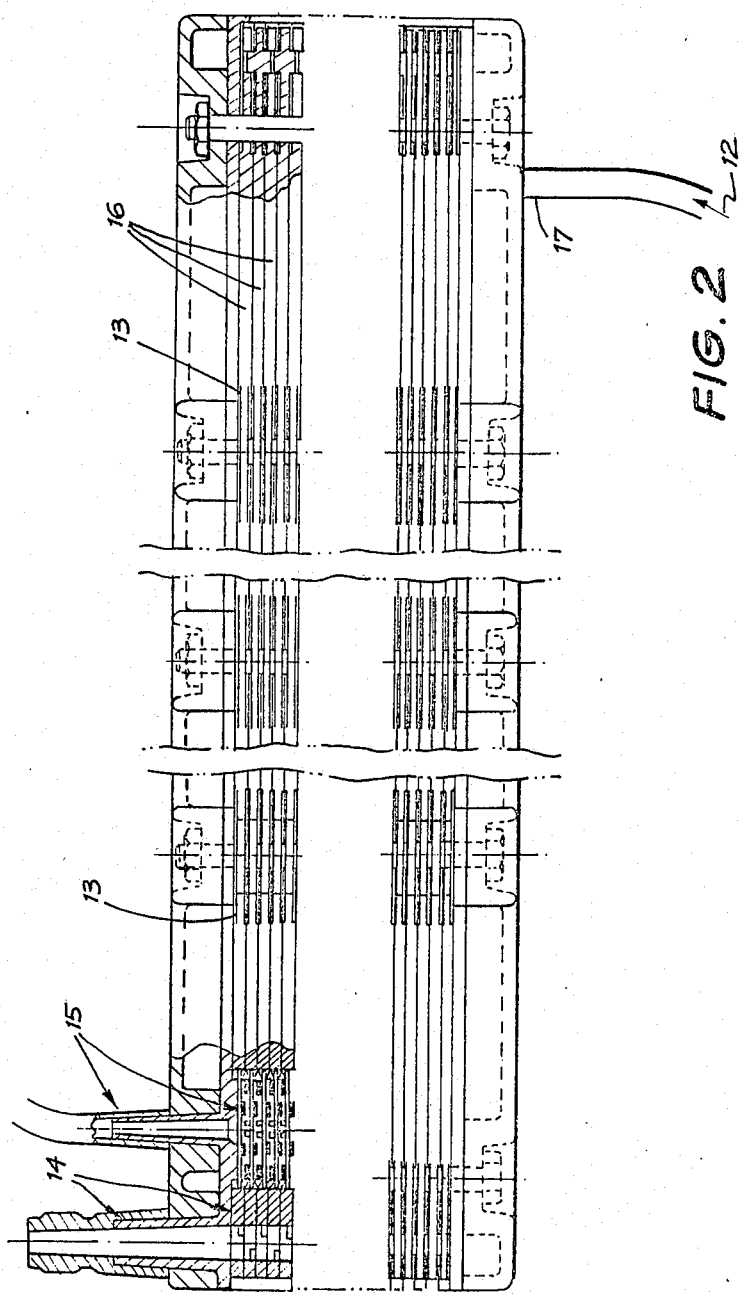
FIG. 2 is a side elevational view of the filter shown in FIG. 1.
Figure 3:
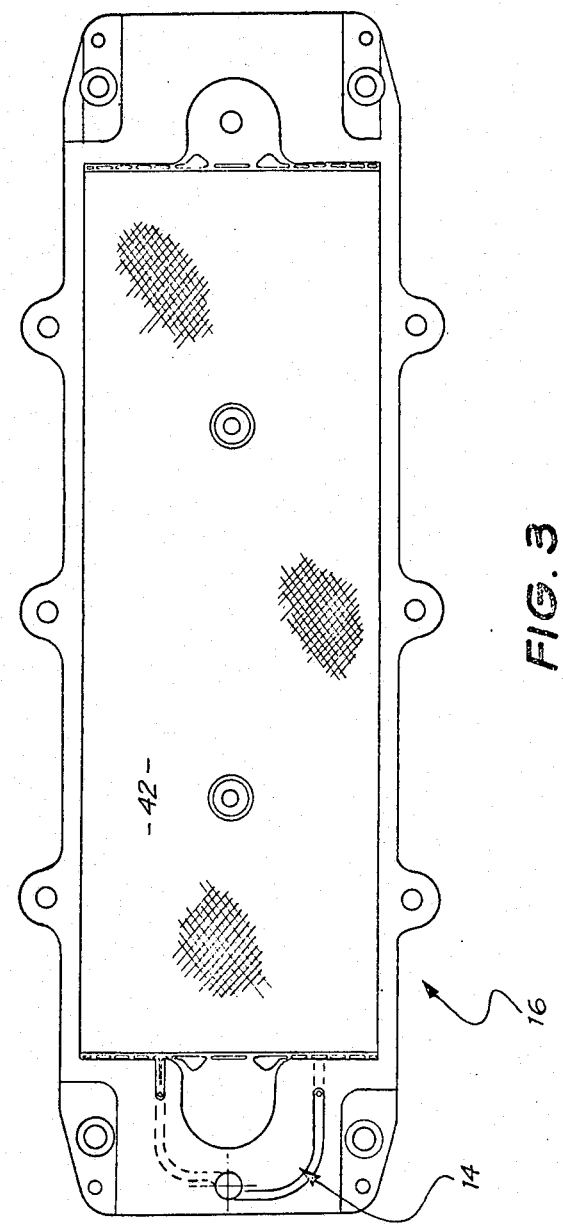
FIG. 3 is a plan view of a backing plate of the filter shown in FIG. 1.

As shown in FIGS. 1 and 2, the preferred apparatus 10 for altering the concentration of a pre-selected component(s) 11 of a feedstock 12 comprises a plurality of barriers 13 adapted to pass said component(s) 11. Inlet and manifold means 17 at the right handside of FIG. 1 (see FIG. 2) are adapted to direct the feedstock into contact with a first surface of each barrier 13. Transfer means 14 are adapted to communicate with the opposite surface of each filter membrane 13 to receive the passed component(s) 11, for removal of said passed component(s) 11 from the apparatus 10. Outlet and manifold means 15 are adapted to remove the treated feedstock 12 from the apparatus 10.

The boundaries of the flowpaths for the feedstock 12 which, in this instance, are as defined by the barriers 13 are adapted to be at least partially enlarged elastically by the passage of feedstock therethrough.

Limiting means in the form of plates 16 are adapted to restrict the extent of elastic enlargement of the flowpaths so as to maintain a laminar flow of said feedstock when the feedstock 12 is flowing through the flowpath at a predetermined operating pressure.

Figure 4:
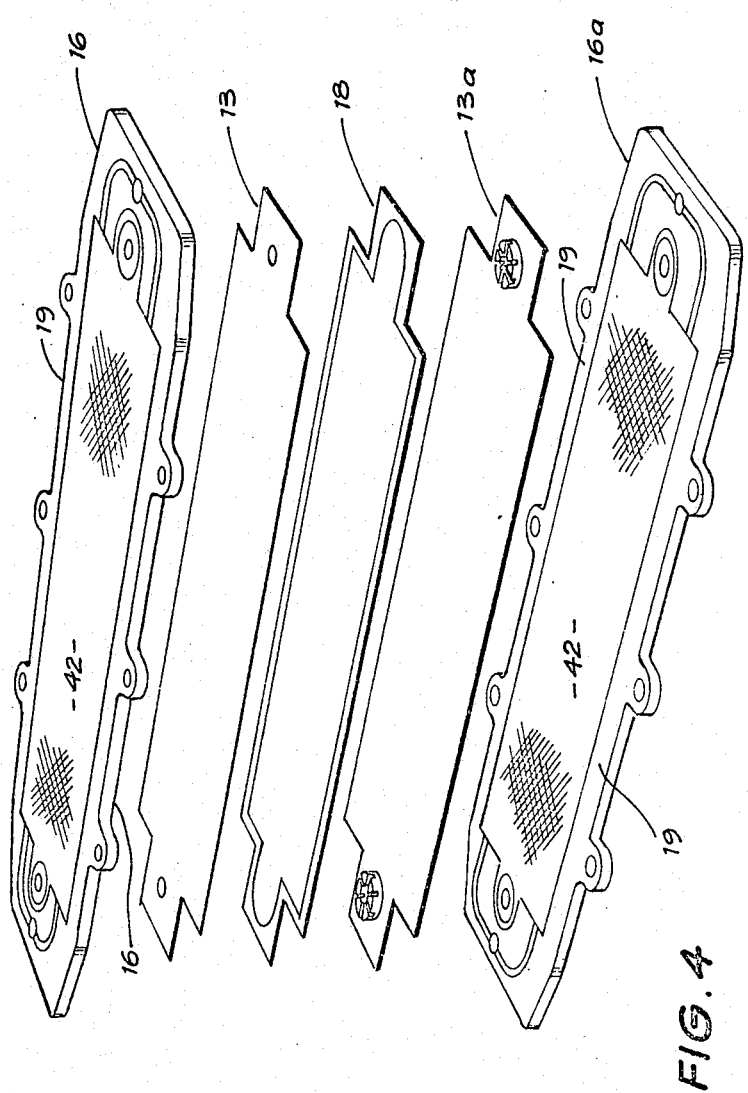
FIG. 4 is an exploded view of a filter unit of the filter shown in FIG. 1.

As shown in FIG. 4, each filter unit consists of a first backing plate 16, a first barrier or membrane 13, a gasket 18, a second barrier or membrane 13a and a second backing plate 16a. The backing plates 16 and 16a have a peripheral sealing shoulder 19 which is operative when the filter is assembled together to seal the periphery of the filter bag formed by membranes 13 and 13a. Alternatively, only one plate 16 could be provided with a shoulder 19 enlarged to engage the other plate 16a in a sealing manner.

Figure 5:
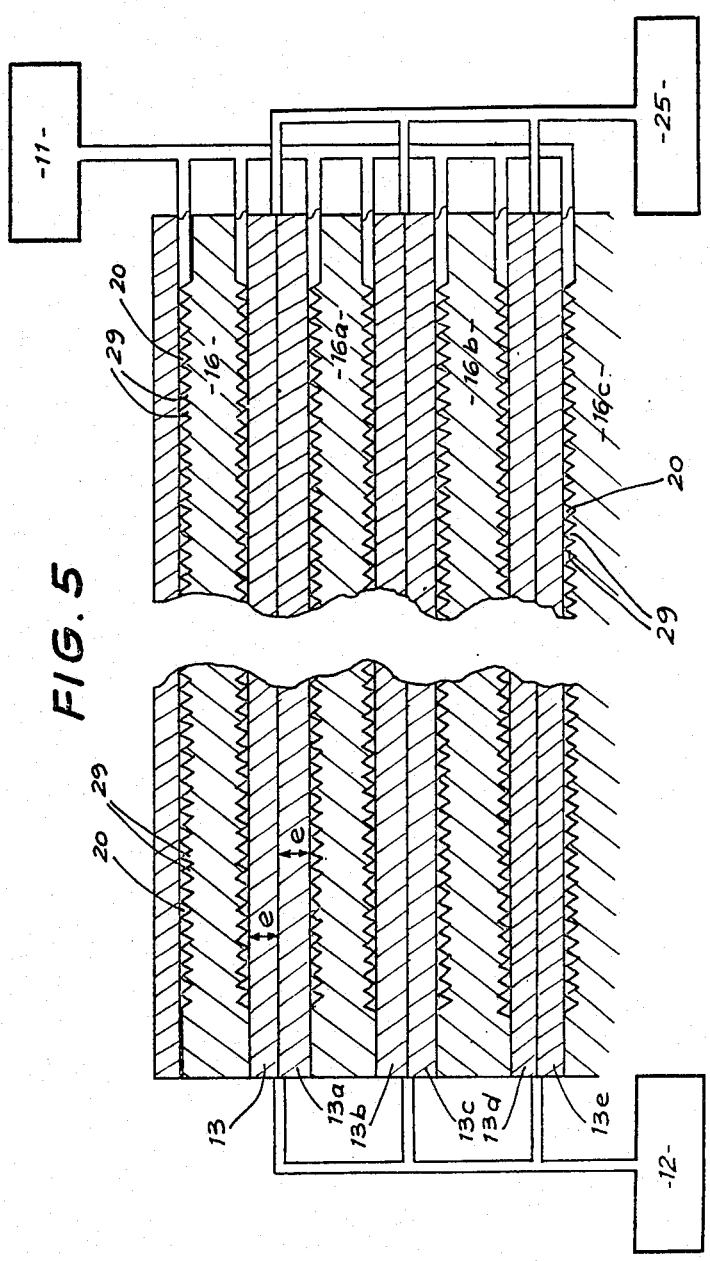
FIG. 5 is a diagrmmatic view of a cross flow filter apparatus constructed in accordance with the principles of the present invention with the filter in a pre-use condition.
Figure 6:
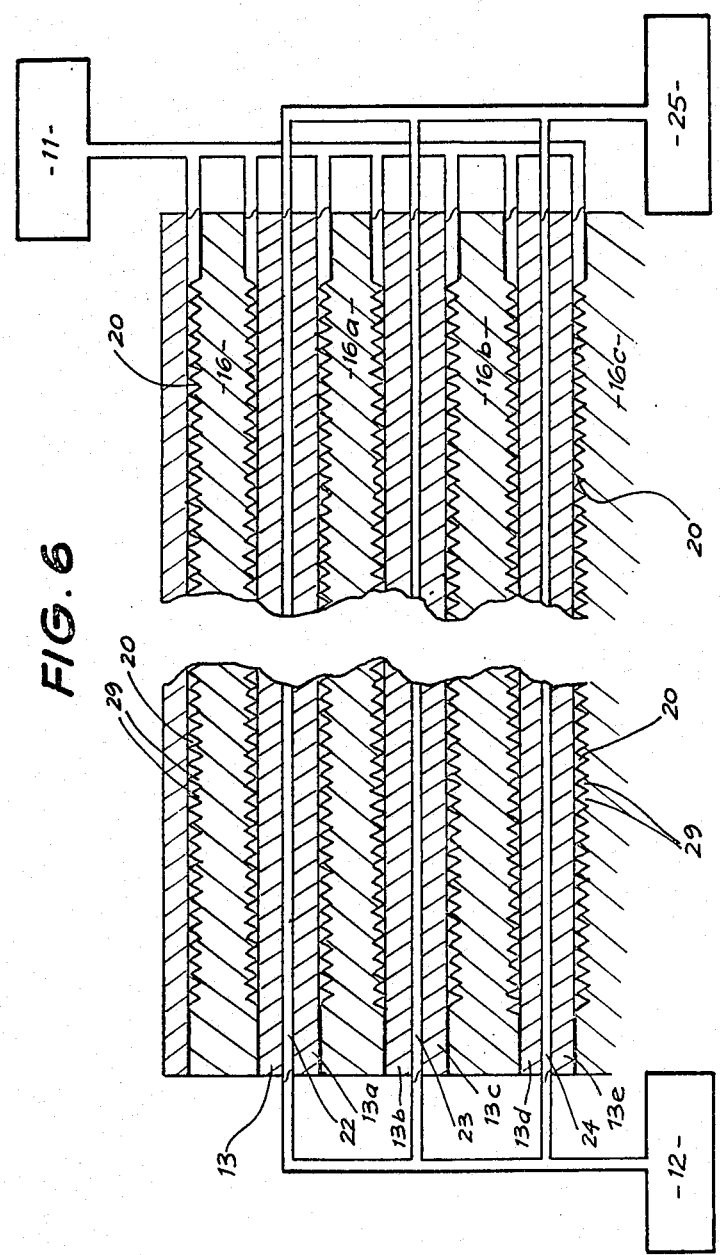
FIG. 6 is a schematic view similar to FIG. 7 with the filter in the steady state of feedstock flow.

Referring now to FIGS. 5 and 6, spacer support or backing plates 16, 16a, 16b and 16b are arrange in a stack in spaced relationship to one another with pairs of compressible barriers or membranes 13, 13a; 13b, 13c and 13d, 13e disposed between adjacent plates. Each barrier is supported by and spaced from each plate by a plurality of coinical studs 29 formed on each surface of each plate with open volumes 20 formed therebetween. Feedstock solution 12 is pumped between each pair of barriers which are compressed under the effects of the high transbarrier or transmembrane pressure which is created by the feedstock to form thin channels 22, 23, and 24 splitting the feedstock solution 12 into a concentrate or retentate 25 and a filtrate of permeate 11.

Figure 7:
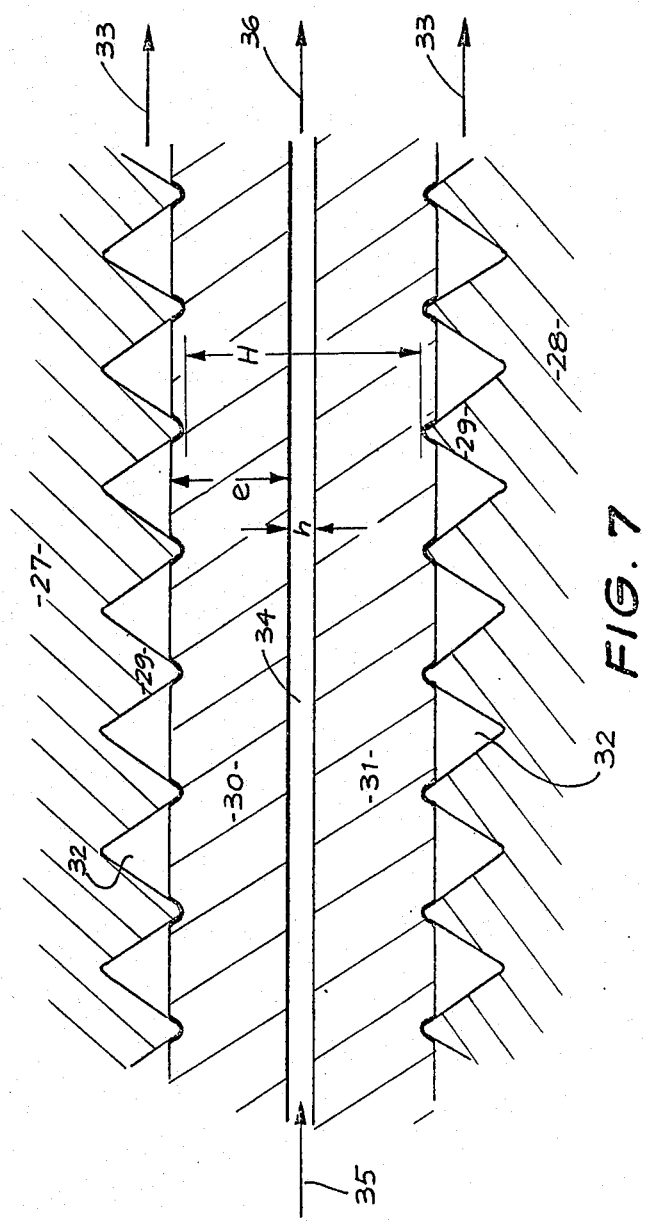
FIG. 7 is an enlarged fragmentry cross-sectional view of a pair of spacer support plates with a pair of compressible membranes disposed therebetween.
Figure 8:
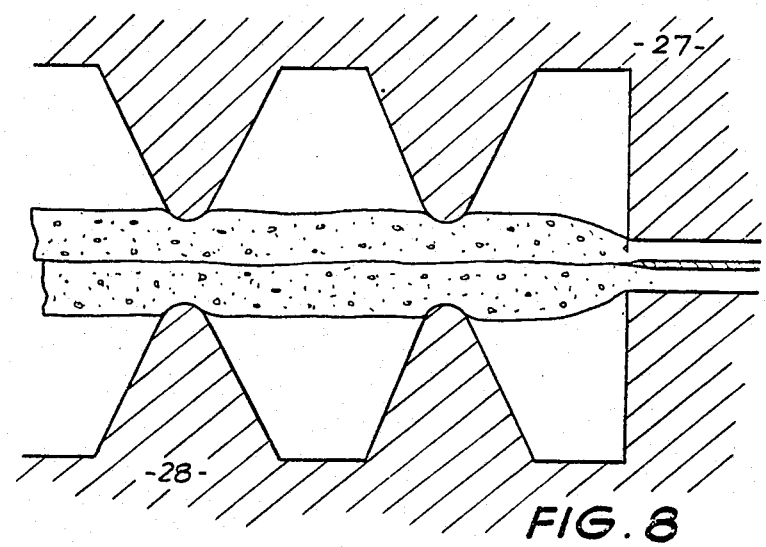
FIG. 8 is a partial cross-sectional schematic view of a filter unit showing the gasket seal at the edge of the two membranes with the filter in a pre-use condition.
Figure 9:
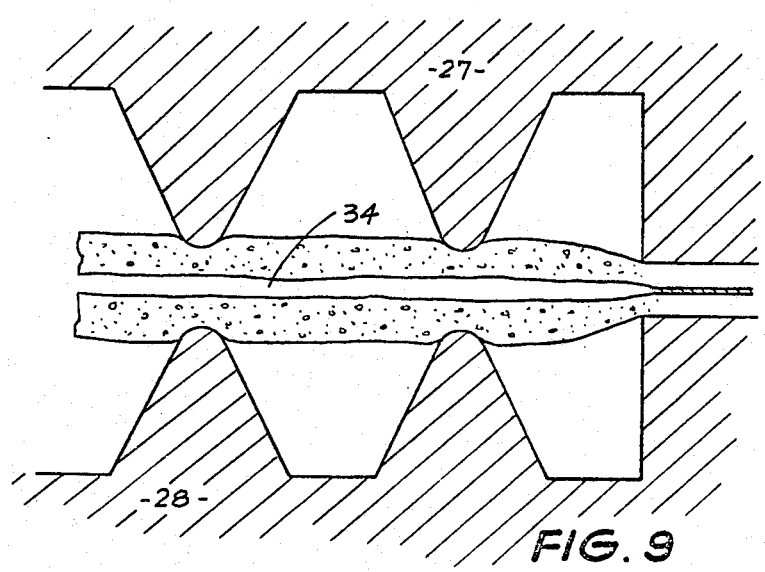
FIG. 9 is a view similar to FIG. 8 with the filter in the steady state of feedstock flow.

Referring to FIG. 7, each pair of opposed spacer support plates 27 and 28 is provided with a plurality of conical studs 29 on the surface thereof which serve to support a pair of membranes 30 and 31 disposed between the support plates. The barriers employed in this embodiment are compressible and resilient, and, in this instance are multilayered anistropic unltrafiltration membranes. Biofilters, filters or membranes provided with a compressible and resilient backing may also be used. The open volumes 32 formed between the studs 29, when interconnected, form a low pressure filtrate or permeate pathway 33. Under conditions of no applied pressure the barriers 30 and 31 would normally be in surface to surface contact, with a flowpath thickness of zero—See FIG. 5. However, under the effects of the high transmembrane pressure which is created by the flow of pressurized feedstock, each of the membranes 30 and 31 is compressed elastically onto the conical studs 29 creating a thin channel or flowpath 34 of variable channel height "h" between the opposed surfaces of the compressible membranes or barriers 30 and 31. Under the effects of cross flow filtration or ultrafiltration, the feedstock solution is split into a filtrate or permeate 33 which passes through the membrane and a concentrate or retentate 36.

As there will be a pressure drop along each flowpath channel 34 from the higher pressure inlet side (left hand side of FIG. 7) to the lower pressure outlet side (right-hand side of FIG. 7), the thickness of the flowpaths will not be constant through the length from inlet to outlet. A slight tapering will occur because the higher inlet pressure will compress the inlet zone of the membranes more than the lower outlet pressure will compress the outlet zone of the membranes.

The distance between opposed spacer plates (typically about 250 microns) is given by "H", and the thickness of the membranes or filters is given by "e" (See FIG. 5). In a dialysis system, where membranes are typically of about 40 micron thickness, the channel height between the membranes remains substantially constant and is predetermined as a consequence of the thickness of the membranes. In a conventional dialysis system H 2e whereas for cross-flow ultrafiltration H 2e.

The preferred thickness of the flowpaths under steady state flow is that which ensures that the elastic enlargement maintains laminar flow under non-gel polarised conditions for prolong periods of time at high flux. As will be apparent from the foregoing description, it is the channel height or flow path thickness whichf has alters the shear rate for a given velocity of fluid. Thus, as the shear rate is inversely proportional to flow path thickness, a reduction in flow path thickness will increase shear rate which will in turn increase flux.

Although variations in feedstocks may or will dictate that the flow path thickness is not a universally chosen parameter, it is preferred that the thickness does not exceed 80 microns or, in some cases 100 microns. In some instances the thickness range extends preferentially from 50 to 100, microns, from 40 to 60 microns and from 10 to 25 microns.

The preferred compressible, high flux membranes used according to the present invention are the membranes disclosed in Australian Patent specification No. 505,494. That specification discloses highly-permeable anistropic membranes with graduated porosity, comprising a mixture of depolymerised and polymeric material, and a plurality of adjacent layers with each layer active as a molecular screen and having a precise molecular weight cut-off, wherein the variation of molecular weight cut-off of the adjacent layers from the top to the bottom of the membrane is a continuous function.

In another form of the invention, the barriers could be constituted by a composite of a first portion which is compressible across its transverse dimension and a second portion which is substantially less compressible across its transverse, dimension, and wherein said limiting means is adapted to contact said first portion of said barrier when it restricts the extent of enlargement of the flowpath.

The gasket means 18 is preferably a compressible cellular or closed-cell foam material, such as polyethylene or polypropylene, which under pressure is compressed from about 1 mm to about 15 microns. Under compression, the cells in the foam material rupture forming a plurality of open cell spaces in contact with the surface to be sealed. Each open cell structure acts, in effect, as a small decompression chamber, with a large number of such chambers being present within a relatively small space, acting as an effective seal against loss of pressure in a filtration or ultrafiltration system operating under pressures (i.e. transmembrane pressure differentials) of about 100 KPa (or about 15 p.s.i )—as opposed to pressure differentials of less than 10 KPa (or less than 1 p.s.i.) which exist in dialysis apparatus.

One means of providing for the supply of fluid to be treated under pressure to form a channel between a pair of filtration or ultrafiltration media 13 with the latter adapted to provide a fluid-tight seal with the adjacent plate 16 in the region surrounding the inlet and the outlet openings as described above is to ultilise radial fluid distribution discs or buttons 40 (See FIG. 1.) of the type described in the Hagstrom et al U.S. Pat. Nos. 3,837,496 and 3,841,491 between the pair of filtration or ultrafiltration media, coincidental with the inlet and outlet openings. However, the necessity of having a plurality of such distribution buttons 40 is detrimental to the compactness of the system, and gives unnecessary flow restriction to the feedstock and there is - under the high operative pressures which exist in apparatus according to the present invention, the necessity to provide an annular compressible sealing gasket (e.g. of polypropylene foam material) on each side of, and concentric with, the button to form a seal under compression between the spacer support plate 16 and the filtration or ultrafiltration media 13.

The active surface 42 of the spacer support plates 16, i.e. wherein passageways are provided for the distribution and collection of the filtrate or permeat 11, may be formed in many various ways according to prior art technique applicable to dialyzing apparatus technology, for example using embossing and stamping techniques.

In this regard reference is made to the surface structure 42 of the support plate 16 disclosed in Miller et al U.S. Pat. No. 4,154,792—wherein the membrane support surface comprises a large plurality of closely juxtaposed conical studs 29 or projections. In some embodiments of the apparatus according to the present invention the type of grooved or channeled manifold structure of the support plate disclosed in the Riede U.S. Pat. No. 4,051,041 can be utilised, especially for the collection of filtrate or permeate from the active surface of the spacer support plate 16 into the permeate outlet part 11 of the apparatus. See also the disclosure of the Alwall et al U.S. Pat. No. 3,411,630 relating to the surface configuration of the spacing members designed to provide a support for the adjacent membrane and to provide a passageway for the dialysing of purifying liquid.

In a preferred form, the present invention provides the basis for filtration apparatus having an energy input requirement as small as about 50 and no more than 150 watts/square meter of membrane installed (c.f. an energy requirement of about 1 kW/square meter of membrane installed for classical prior art systems) which means that the present invention provides the basis for a significant saving in energy requirements when compared to known prior art systems.

Another consequence of use of a preferred form of treatment system according to the present invention is that the shear rate tends to be extremely high. As a result, the specific flux for a given effluent is increased and it is thus possible to operate the filtration apparatus under non-gel polarized conditions at high flux. This is of importance when it is desirable to maximise molecular selectivity and leads to an easy cleaning of the barriers or membranes.

An advantage of a treatment system according to a preferred form of the present invention (apart from the energy saving) is that a very high surface area of membrane of filter can be contained within a relatively small volume. Generally speaking, about 10 times more membrane or filter per unit of volume can be contained within a given area than is possible with classical prior art ultrafiltration or cross-flow filtration equipment.

The use of deformation of the membrane itself to create the channel also results in the very high stability of the filtration equipment according to a preferred form of the present invention. For example, if for any reason the channel height or flowpath thickness $h_c$ has a tendency to decrease, the surface area of the cross-section of the channel decreases. This means that the pressure drop throughout the particular filtration unit increases, which in turn means that the inlet pressure increases resulting in a tendency for the channel height or flowpath thickness $h_c$ to increase. Thus, there is an autostabilization or autoflush effect which facilitates cleaning of the unit.

Figure 10:
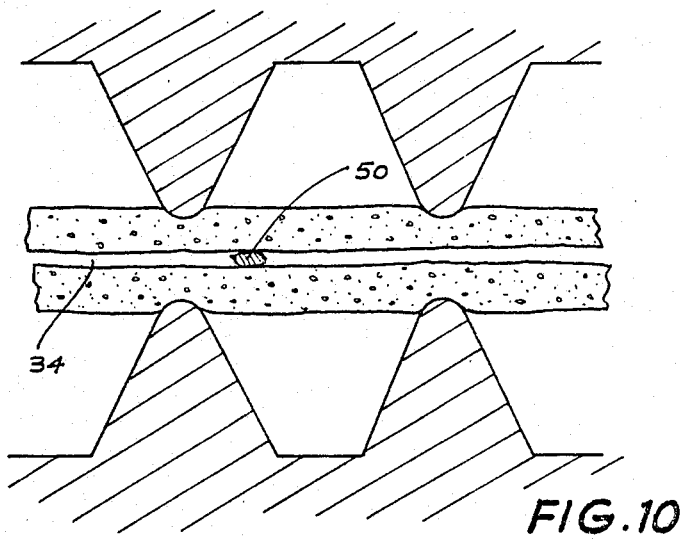
FIG. 10 is a schematic view showing a blockage forming in the flowpath.
Figure 11:
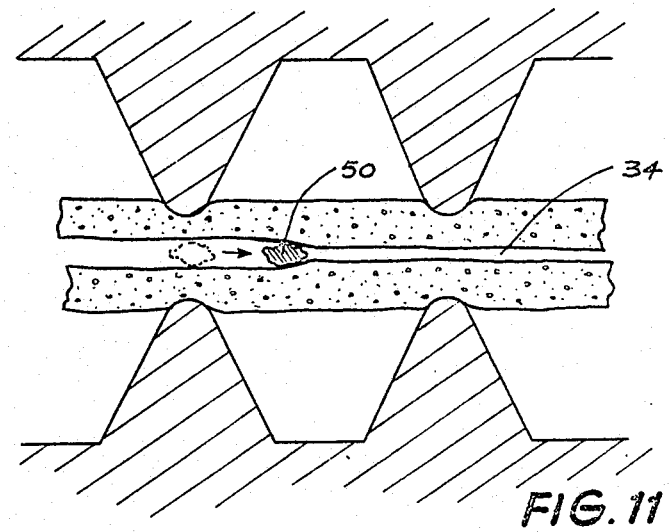
FIG. 11 is a schematic view similar to FIG. 10 showing movement of the blockage.

In other words, if a channel 34 does become plugged by a cake 50 as shown in FIG. 10, the surface area of the channel will decrease and the pressure therein will rise. This causes the channel 34 to expand and open (as shown in FIG. 11) to flush the cake 50 which has plugged the filtration unit. This characteristic, known as the autostabilization effect is very important in respect of the self-cleaning ability of the filtration system according to a preferred form of the present invention.

With membranes incorporated into the apparatus, the apparatus is adapted for cross-flow ultrafiltration. When the membrane is replaced by a biofilter or filter the equipment is suitable for cross-flow filtration with two separative effects:

(1) to remove the filtration cake constantly through high shear rate, and
(2) the tubular pinch effect.

In any given solution where the liquid medium and the particulate matter contained therin are of different density, then it is possible to obtain a separation in two ways. If the particulate matter is heavier than the liquid, and if the feedstock solution (concentrate) is caused to flow upwards, i.e. in a substantially vertical direction, in the channel, then the particulate matter tends to concentrate in the centre of the channel, with the result that it is possible to remove the permeate without plugging of the filter caused by the particulate matter.

On the contrary, when the particualte matter is lighter thàn the liquid, the feedstock concentrate is caused to flow in a downwards direction, again the particulate matter tends to agglomerate in the centre of the channel, and again it is possible to remove the permeate without plugging of the filter caused by particulate matter.

Using the cartridge or filter apparatus shown in FIGS. 1 to 7 and an anisotropic nylon ultrafiltration membrane of the type whose properties and method of preparation are disclosed in Australian Pat. No. 505,494, tap water from Sydney, Australia was purified by ultrafiltration.

The tap water feedstock was recirculated through the cartridge over a 12 hour period while the flux decline was monitored. Initially, the back-pressure was set at 88 kpa. After four hours, the pressure was increased to 100 kpa, the recommended minimum pressure for this application. The cross-flow rate was 186 L/HR. and the temperature was approximately 30 degrees centrigrade. At an inlet pressure of 88 kpa, the stabilized flux was 64 L/SP.M.HR. The pressure drop across the cartridge was 20 kpa. The stabilized flux at 100 kpa was 74.3 L/SQ.M.HR., and showed no decline over the last 8 hours of the experiment. The flux versus pressure relationship for the cartridge indicated that the experiment was carried out in a pre-gel polarized condition. The total dry solids content of 0.19 G/L for the feedstock and 0.08 G/L for the permeate gave a total solids rejection of 0.19 G/L for the feedstock and 0.08 G/L for the permeate gave a total solids rejection of 60 O/O for this experiment.

Chemical analysis of the permeate indicated that it contained an average of 2.5 PPM silicons, 12.9 PPM calcium, 5.0 PPM magnesium, and no measurable iron, manganese or copper. Hardness for this permeate was also determined as 5.3 MG./L as calcium carbonate equivalent, and the total dissolved solids were 15.2 UG/L.

The table below shows the power and energy requirements for the ultrafiltration experiment based on membrane area and permeate volume:

Pump Type: Gear
Power Supply: Single Phase
Membrane Area (SQ.M.) 0.418
Power Consumption (KW): 0.098
Power per unit of membrane area (KW/SQ.M.) 0.21
Feed cross flow (L/HR.): 186
Membrane Flux (L/SQ.M.HR.): 74.3
Power per unit of permeate volume (MJ/CU.M.): 10.4

The above data shows the low power consumption per unit of purified water, as well as the low power consumption per unit area of membrane.

A further aspect of the invention relates to the adaption of the apparatus for electrodialysis.

The particular configuration of the filtration modules of a preferred form of the present invention allows for the incorporation into the two end plate manifolds of a stacked assembly of plates of two metallic plates as electrodes to establish an electric field. In this case, if, for example, separate anionic and cationic membranes were to be placed between the two metallic plates the filtration module would be adapted to operate as an electrodialysis unit.

If one charged membrane and one neutral membrane were placed between the two plates the unit would be adapted to operate as a reverse electrodialysis or transport depletion unit.

Figure 12:
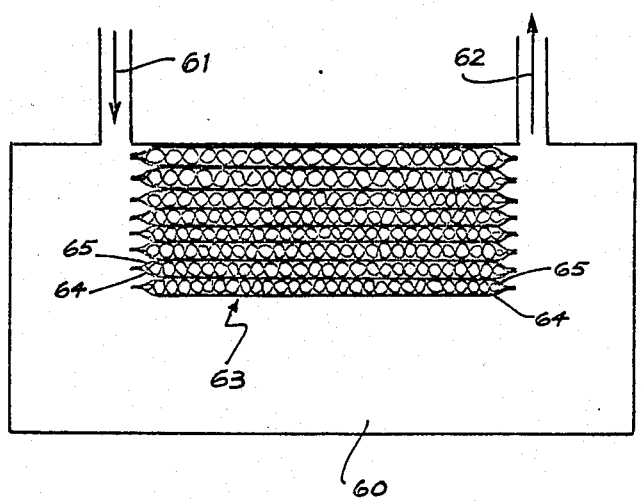
FIG. 12 is a cross-sectional side view of a cross-flow filter according to a second embodiment of the invention, FIG. 13 a partially cutaway perspective view of the filter shown in FIG. 12.
Figure 14:
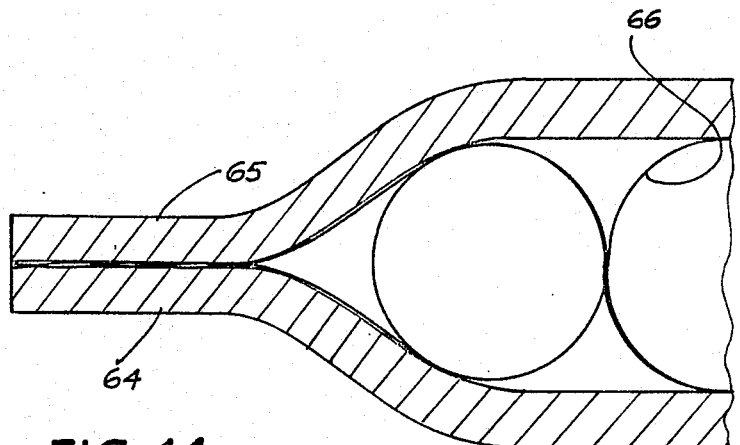
FIG. 14 is a cross-sectional view of a membrane envelope of the filter shown in FIGS. 12 and 13.
Figure 13:
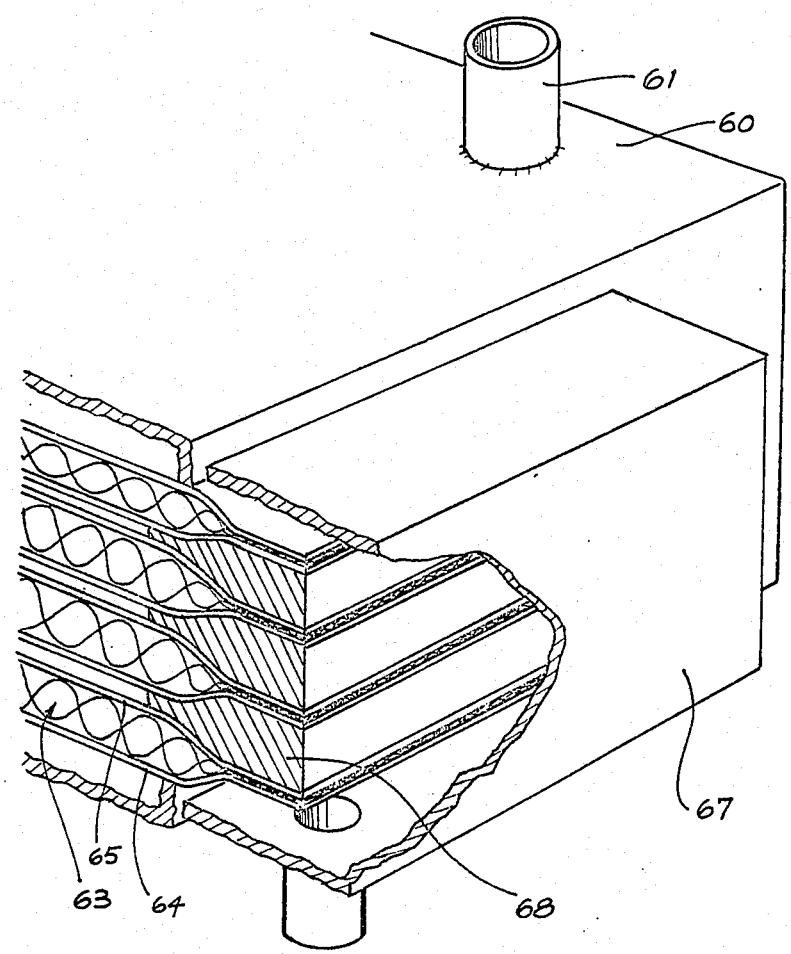

A second embodiment of the invention is shown in FIGS. 12 to 14. In this embodiment, the apparatus includes a main body portion 60 having an inlet thereto 61 and an outlet therefrom 62. Within the main body portion 60 is a plurality of membrane envelopes 63. Each envelope 63 includes a first membrane or barrier 64 and an overlying second membrane or barrier 65 which are held in spaced relation by grid 66. The periphery of the overlying barriers 64 65 is sealed together as shown in FIG. 14 except for one side thereof which projects into manifold 67 as shown in FIG. 13. Manifold 67 constitutes the transfer means for the apparatus and the space between each of the envelopes 63 is closed by a sealing material such as aryldite as identified by numeral 68 in FIG. 13.

When fluid is admitted to the body portion 60 under pressure the contacting surfaces of opposed barriers 64 and 65 are separated in the manner described above in relation to the first embodiment of the invention. The selected component passes through the barriers 64 65 into the flow channel defined between the two barriers 64 65 by the grid 66 and thence to the manifold 67 through the open ends 68 of the envelopes 63 (see FIG. 13).

Figure 15:
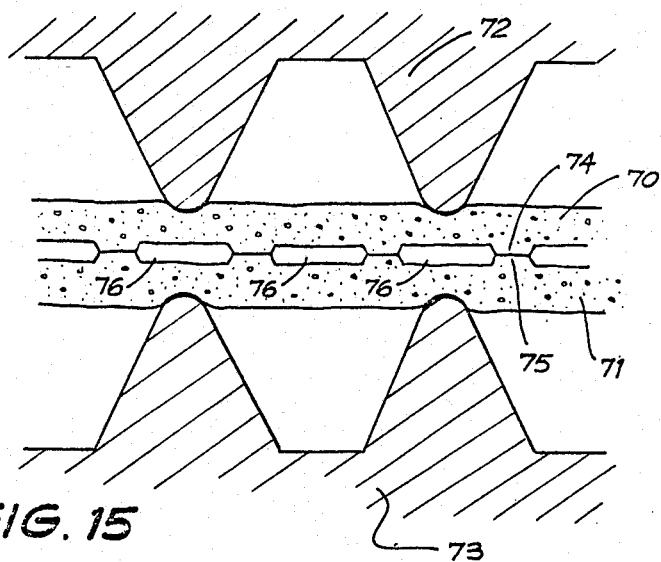
FIG. 15 is a cross-sectional schematic view of a further embodiment of the invention, and, FIG. 16 is a cross-sectional schematic view of yet another embodiment of the invention.

A further embodiment of the invention is shown in FIG. 15 wherein the membranes or barriers 70 and 71 have aligned and co-operating projections 74 and 75 which define flowpaths 76. In this way, the flowpath between the barriers 70 and 71 is divided into a plurality of parallel flowpaths each of which is restricted in its elastic enlargement by the backing plate 72 and 73.

Figure 16:
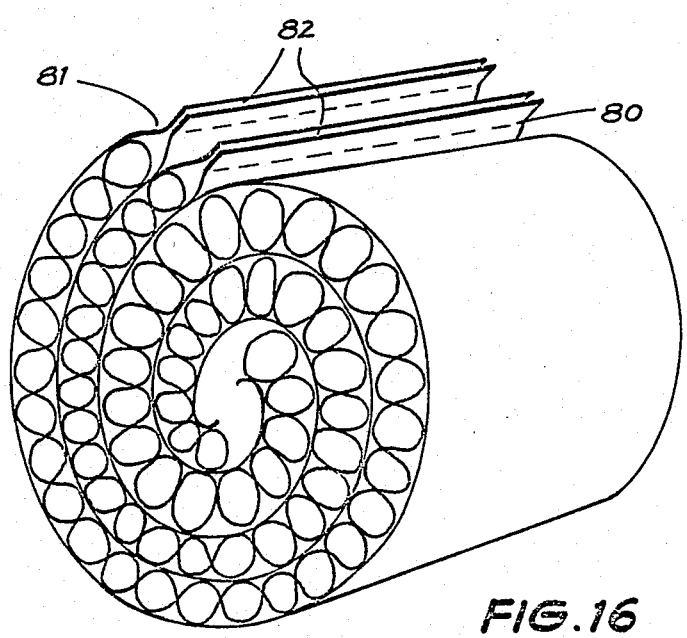

Yet another embodiment of the invention is shown in FIG. 16 wherein envelopes 80 and 81 are spirally wound within each other. Each envelope 80 and 81 is substantially similar to the envelope 63 shown in FIGS. 12 to 14. Each envelope 80 and 81 has outlet means 82 and the assembly of envelopes is adapted to be positioned within a housing having an inlet thereto and an outlet therefrom.

As indicated above, the invention is not limited to cross flow filtration or retention. For example, the preferred form of the invention described in relation to FIGS. 1 to 7 could be used to introduce a preferred species into the feedstock by entry through the transfer port and the barrier(s) in the reverse direction to that described above.

One such application concerns the introduction of oxygen (the preferred specie) into blood (the feedstock). In this instance, the barriers are so chosen that the oxygen may readily flow thereacross but all components of the blood are retained in the flowpaths.

What is claimed is:

1. Cross-flow filtration apparatus for removing a preselected component from a fluid feedstock, which comprises:
   a first plate member having a plurality of closely spaced fixed projections, said projections having tips that are in a first plane;
   a second plate member having a plurality of closely spaced fixed projections, said projections of said second plate member having tips that are in a second plane;
   means supporting said first and second plate members in a fixed, spaced relationship to each other with the projections of said first plate member facing and in a fixed relationship to the projections of the second plate member;
   first and second compressible, resilient membranes of sheet material through which the preselected component can pass, each of said membranes having a first surface and an opposite surface;
   said first membrane having its first surface thereof in contact with the first surface of said second membrane when there is no flow of feedstock;
   said first membrane having its opposite surface in contact with the projections of said first plate member and said second membrane having its opposite surface in contact with the projections of said second plate member;
   said supporting means for said first and second plate members maintaining said first and second planes at a fixed distance from each other that is no greater than the non-compressed combined thickness of said first and second membranes located between said first and second planes;
   inlet means for introducing pressurized feedstock into the apparatus and between the first and second membranes to force the compressible, resilient menbranes themselves to become compressed against the fixed projections of said first and second plate members by the pressurized feedstock passing through the apparatus, and thus separate the membranes from each other as a result of the distance between the first and opposite surfaces of each membrane becoming smaller due to compression, to form a feedstock flow path between the membranes.

2. The apparatus of claim 1 wherein the membranes have peripheries and further including means sealing the peripheries of said membranes to render the flow path leakproof.

3. The apparatus of claim 2, wherein the means sealing the peripheries of said membranes comprise compressed gasketing disposed between the peripheries of the membranes.

4. The apparatus of claim 3 wherein the gasketing is provided by a compressible cellular or closed-cell foam material which, under pressure, is compressed, so that the cells in the foam material rupture forming a plurality of open cell spaces in contact with a surface to be sealed.

5. The apparatus of claim 1 wherein each membrane is compressible across its entire transverse dimension.

6. The apparatus of claim 1 wherein each membrane comprises a composite of a first portion which is compressible across its transverse dimension and a second portion which is substantially less compressible across its transverse dimension, and wherein said projections contact said first portion of each membrane.

7. The apparatus of claim 1 comprising a stacked arrangment of membranes and plate members and wherein projections are formed on each side of each plate member.

8. The apparatus of claim 1 wherein the spacing of the projections and the compressibility of the membranes are such that when the feedstock in the flow path exceeds its prescribed operating pressure because of a blockage in the flow path, the membranes further compress to expand the flow path further temporarily but repeatedly at the location of the blockage to permit the blockage to proceed through said flow path until the blockage is removed from the flow path.

* * * * *